US012786887B2

(12) United States Patent
Wang et al.

(10) Patent No.: US 12,786,887 B2
(45) Date of Patent: Nov. 3, 2026

(54) CONFIGURATION-BASED UE MSD REPORTING

(71) Applicant: Apple Inc., Cupertino, CA (US)

(72) Inventors: Fucheng Wang, Cupertino, CA (US); Anatoliy S Ioffe, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 18/368,272

(22) Filed: Sep. 14, 2023

(65) Prior Publication Data

US 2024/0406879 A1 Dec. 5, 2024

Related U.S. Application Data

(60) Provisional application No. 63/469,718, filed on May 30, 2023.

(51) Int. Cl.

*H04W 52/14* (2009.01)
*H04W 52/24* (2009.01)

(52) U.S. Cl.

CPC ....... *H04W 52/146* (2013.01); *H04W 52/243* (2013.01); *H04W 52/245* (2013.01)

(58) Field of Classification Search

CPC ............. H04W 52/146; H04W 52/243; H04W 52/245; H04W 72/541; H04W 52/367;

(Continued)

(56) References Cited

U.S. PATENT DOCUMENTS 10,172,125 B2 * 1/2019 Kusashima ........... H04W 24/10
2020/0313812 A1 * 10/2020 Park ........................ H04L 5/001

(Continued)

FOREIGN PATENT DOCUMENTS

WO 2019050215 A1 3/2019

OTHER PUBLICATIONS

R4-2215667 "Views on signaling for improved lower MSD", Apple Inc., 3GPP TSG-RAN WG4 Meeting #104bis-e, Online, Oct. 10-19, 2022.

(Continued)

*Primary Examiner* — Diane D Mizrahi
*Assistant Examiner* — Iyonda L Lewis
(74) *Attorney, Agent, or Firm* — FLETCHER YODER PC

(57) ABSTRACT

Embodiments disclosed herein relate to techniques for determining a maximum sensitivity degradation (MSD) value at a user equipment (UE), and sending the value to a network for scheduling a frequency band combination for uplink and/or downlink communication. The network configures the frequency band combination for the UE, and determines whether there may be potential interference when the UE uses the frequency band combination. If so, then the network sends an indication to the UE to deactivate uplink transmission. The UE then determines reference sensitivity (REFSENS) of its receiver when the network does not send a downlink transmission on the frequency band combination. The UE sets its transmitter to transmit with a predetermined (e.g., maximum) transmission power, sends uplink transmissions, and determines an interference power when operating using the frequency band combination. The UE then determines the MSD value based on the REFSENS and the interference power.

20 Claims, 6 Drawing Sheets

(58) Field of Classification Search
CPC . H04W 72/23; H04W 72/0473; H04W 24/10; H04W 72/0457; H04W 72/11; H04W 72/20; H04W 52/14; H04W 52/36; H04B 17/345; H04B 17/24; H04B 17/203; H04B 17/204; H04B 17/19
See application file for complete search history.

(56) References Cited

U.S. PATENT DOCUMENTS

| | | | | |
|---|---|---|---|---|
| 2021/0126753 | A1* | 4/2021 | Mochizuki | H04L 5/0037 |
| 2022/0224460 | A1 | 7/2022 | Lim et al. | |
| 2022/0255684 | A1* | 8/2022 | Park | H04B 17/3912 |
| 2022/0322474 | A1* | 10/2022 | Lim | H04L 5/0092 |
| 2023/0096224 | A1 | 3/2023 | Wang | |
| 2024/0323857 | A1* | 9/2024 | MolavianJazi | H04W 52/146 |
| 2025/0212243 | A1* | 6/2025 | Guo | H04L 5/0073 |
| 2025/0330843 | A1* | 10/2025 | Yamine | H04W 24/04 |

OTHER PUBLICATIONS

R4-2218117 “Views on signaling for lower MSD”, Apple Inc., 3GPP RAN WG4 Meeting #105, Toulouse, France, Nov. 14-18, 2022.
R4-2305365 “Views on lower MSD signaling and UE RF requirements”, Apple Inc., 3GPP TSG-RAN WG4 Meeting #106bis-e, Online, Apr. 17-26, 2023.
R4-2306590 “WF on lower MSD”, Huawei, HiSilicon, 3GPP TSG RAN WG4 Meeting #106bis-e, Online, Apr. 17-26, 2023.
R4-2309096 “On lower MSD signaling and UE RF requirements”, Apple Inc., 3GPP RAN WG4 Meeting #107, Incheon, South Korea, May 22-26, 2023.
Combined Search and Examination Report for Great Britain Patent Application No. GB2407282.9 dated Feb. 6, 2025; 9 pgs.
3GPP TS 38.101-3 V15.16.0 (Sep. 2020)—“NR; User Equipment (UE) radio transmission and reception; Part 3: Range 1 and Range 2 Interworking operation with other radios”.

* cited by examiner

200

| EUTRA-NR DC CONFIGURATION (202) | EUTRA / NR BAND | UL COEFFICIENT (204) | | DL COEFFICIENT (206) | | HARMONIC / IMD ORDER (208) | VICTIM BAND (210) | INTERFERENCE TYPE (212) |
|---|---|---|---|---|---|---|---|---|
| DC_20A_n8A | 20 | a | 2 | b | –1 | 3 | 20 | IMD |
| | n8 | c | –1 | d | 0 | | | |
| DC_20A_n8A | 20 | a | 3 | b | –1 | 5 | 20 | IMD |
| | n8 | c | –2 | d | 0 | | | |
| DC_20A_n8A | 20 | a | –2 | b | 0 | 5 | n8 | IMD |
| | n8 | c | 3 | d | –1 | | | |

FIG. 10

CONFIGURATION-BASED UE MSD REPORTING

CROSS-REFERENCE TO RELATED APPLICATIONS

This application claims the benefit of U.S. Provisional Application No. 63/469,718, filed May 30, 2023, entitled "CONFIGURATION-BASED UE MSD REPORTING," which is hereby incorporated by reference in its entirety for all purposes.

BACKGROUND

The present disclosure relates generally to wireless communication, and more specifically to improving wireless communication with a network.

A wireless communication network, such as a cellular network, may determine whether and/or how to schedule uplink and/or downlink communication with user equipment based on an estimated interference that may exist when the user equipment operates on a certain frequency band combination. However, this estimated interference (e.g., a maximum sensitivity degradation (MSD) value) may be a "worst case scenario," such that, in at least some cases, the estimated interference may not actually exist. As such, the network may de-prioritize the user equipment, schedule the user equipment with lesser operating characteristics, or even not schedule the user equipment altogether, even though the user equipment may not actually exhibit the estimated interference.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes ceasing uplink transmissions on a transmitter of user equipment, receiving a first indication of reference sensitivity at a receiver of the user equipment when a base station is not sending a downlink transmission to the receiver, and setting the transmitter to transmit at a predetermined power level. The method also includes causing the transmitter to transmit the uplink transmissions at the predetermined power level, receiving a second indication of interference power at the receiver, and causing the transmitter to transmit a maximum sensitivity degradation (MSD) value based on the reference sensitivity and the interference power.

In another embodiment, tangible, non-transitory, computer-readable media, stores instructions that cause processing circuitry to receive a first indication of reference sensitivity of a receiver of user equipment when a base station is not sending a downlink transmission to the receiver, and cause a transmitter of the user equipment to transmit a signal at a predetermined power level. The instructions that cause the processing circuitry to receive a second indication of interference at the receiver, and cause the transmitter to transmit a maximum sensitivity degradation (MSD) value to the base station based on the reference sensitivity and the interference.

In yet another embodiment, an electronic device includes a transmitter, a receiver, and processing circuitry communicatively coupled to the transceiver. The processing circuitry is configured to determine a combination of a plurality of component carriers to allocate to user equipment, cause the transmitter to send an indication to the user equipment to determine a receiver sensitivity degradation value based on interference when operating using the combination, and cause the receiver to receive the receiver sensitivity degradation value from the user equipment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 10 is a table depicting example parameters for determining whether self-interference exists in the user equipment of FIG. 1, according to embodiments of the present disclosure.

DETAILED DESCRIPTION OF SPECIFIC EMBODIMENTS

Figure 1:
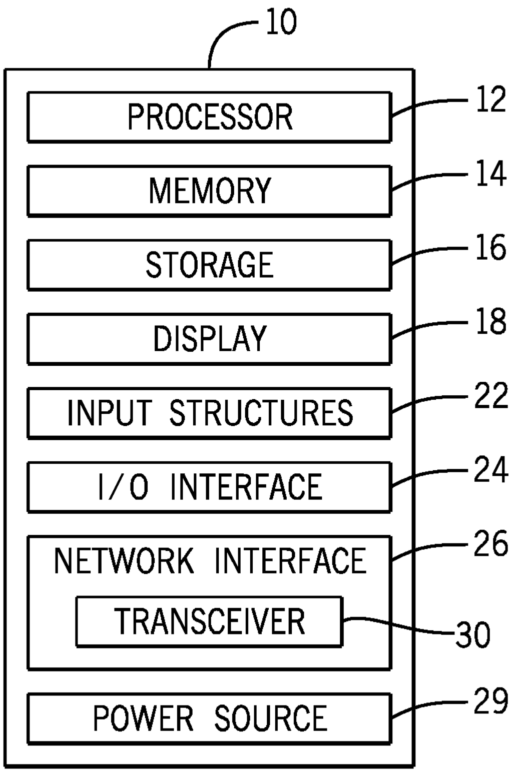
FIG. 1 is a block diagram of user equipment (e.g., an electronic device), according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

Embodiments herein provide various apparatuses and techniques to determine a maximum sensitivity degradation (MSD) value at a user equipment, and sending the value to a network for scheduling a frequency band combination for uplink and/or downlink communication. The network may configure the frequency band combination for the user equipment, and determine whether there may be potential interference when the user equipment uses the frequency band combination. If so, then the network may send an indication to the user equipment to deactivate uplink transmission. The user equipment may then determine reference sensitivity (REFSENS) of its receiver when the network does not send a downlink transmission on the frequency band combination. The user equipment may set its transmitter to transmit with a predetermined (e.g., maximum) transmission power, send uplink transmissions, and determine an interference when operating using the frequency band combination. The user equipment may then determine the MSD value based on the REFSENS and the interference power.

FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including user equipment, a desktop or notebook computer, a portable electronic or handheld electronic device such as a wireless electronic device or smartphone, a tablet, a wearable electronic device, and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the user equipment 10 may include any suitable source of power, such as a rechargeable lithium polymer (Li-poly) battery and/or an alternating current (AC) power converter.

Figure 2:
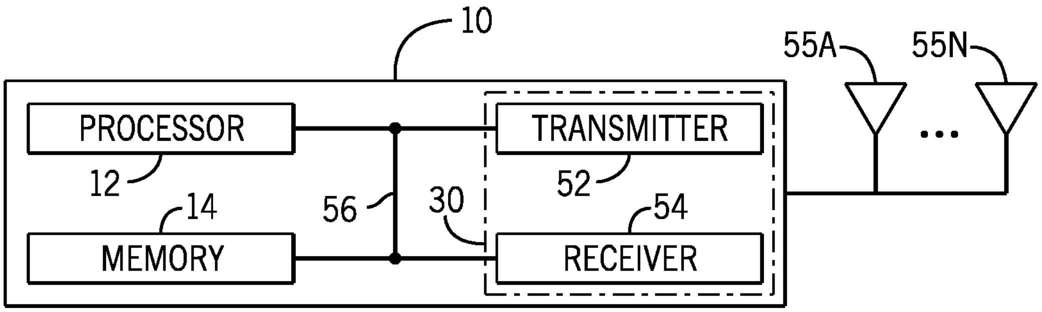
FIG. 2 is a functional block diagram of the user equipment of FIG. 1, according to embodiments of the present disclosure.

FIG. 2 is a functional block diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N (e.g., of an antenna group or module) may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
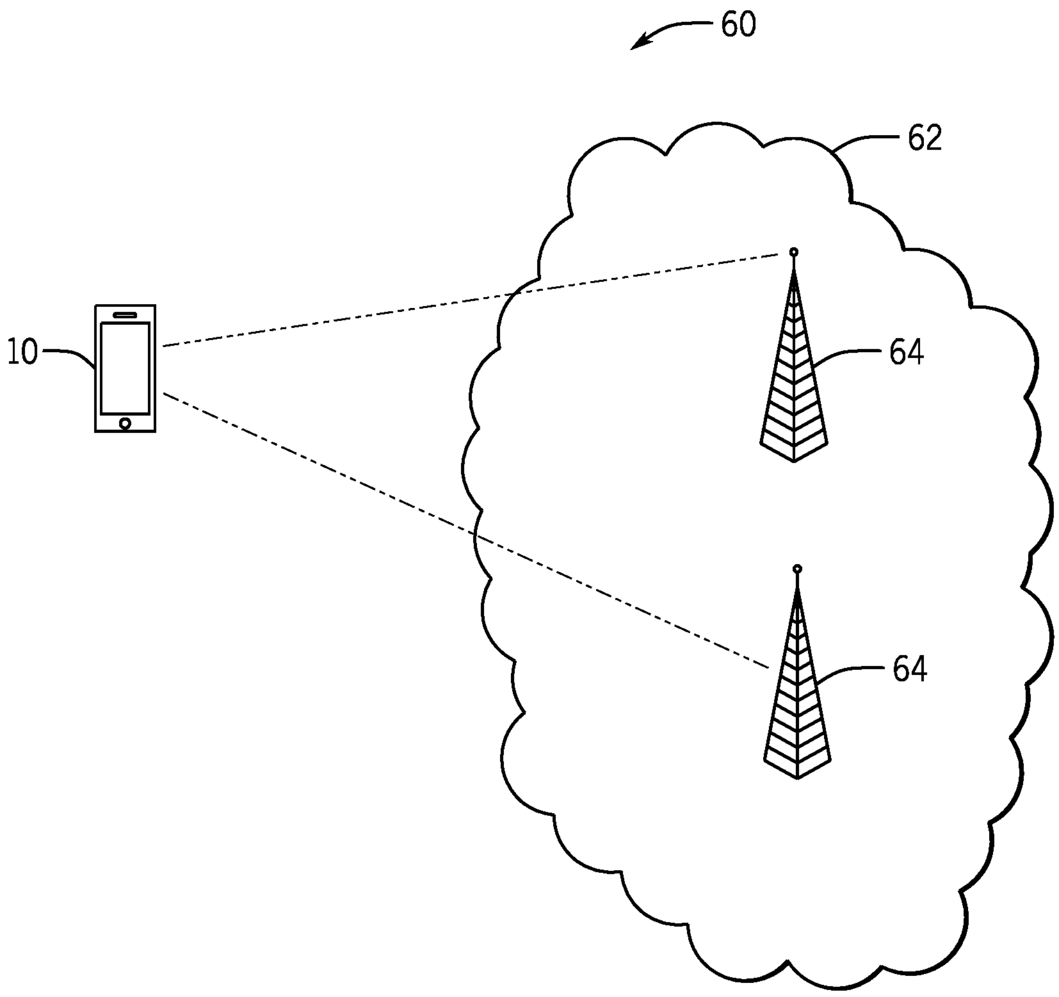
FIG. 3 is a schematic diagram of a wireless communication network supported by one or more base stations and including the user equipment of FIG. 1, according to embodiments of the present disclosure.

FIG. 3 is a schematic diagram 60 of a wireless communication network 62 supported by one or more base stations 64 and including the user equipment 10 of FIG. 1, according to embodiments of the present disclosure. In particular, the one or more base stations 64 may include Evolved NodeB (eNodeB) base stations that may provide 4G/LTE coverage via the wireless communication network 62 to the user equipment 10, Next Generation NodeB (gNodeB or gNB) base stations that may provide 5G/New Radio (NR) coverage via the wireless communication network 62 to the user equipment 10, or any other suitable base stations that provide any suitable radio access technology (e.g., such as 6G, beyond 6G, and so on) coverage via the wireless communication network 62 to the user equipment 10. Each of the user equipment 10 and the one or more base stations 64 may include at least some of the components of the user equipment 10 shown in FIGS. 1 and 2, including one or more processors 12, the memory 14, the storage 16, the transmitter 52, the receiver 54, and the associated circuitry shown in FIG. 4.

With this in mind, in the 3GPP, the impact of self-interference to reference sensitivity (or REFSENS) degradation of the receiver 54 for a frequency band combination has been defined as the Maximum Sensitivity Degradation (or MSD) in units of decibels (dB). REFSENS is defined as the minimum receive signal power level which may be demodulated by the receiver 54 to achieve certain or threshold percentage of data throughput under a digital signal modulation scheme, such as quadrature phase shift keying (QPSK). The MSD value may be generally referred to as a sensitivity degradation value of the receiver 54 of the user equipment 10. Depending on carrier configurations and interference mechanism, the MSD value may range from low single digit dB to 30+ dB based on linearity and isolation performance of radio frequency front-end components (e.g., amplifiers, filters, and so on). It should be understood that "carrier" as used herein refers to component carrier and may include a unit of frequency range or bandwidth that the network 62 may assign to the user equipment 10 for wireless transmission and/or reception, and "carrier combination" as used herein may include a combination of multiple carriers assigned to the user equipment 10 by the network 62 (e.g., indicated at a single time, via a radio resource control (RRC) configuration) for wireless transmission and/or reception (e.g., simultaneously or at different times).

There is concern for frequency band combinations with MSD above 20 dB, as resulting communications may be poorer quality, which may restrict usage of certain carrier configurations and render network operators to become less interest in configuring those frequency combinations for the user equipment 10. However, MSD has been defined as the minimum requirement under a worst-case test configuration.

It was not originally meant to be used for network scheduling, nor as a criterion for whether a frequency band combination may be configured for the user equipment 10, but as an indirect way of verifying performance of the radio frequency front-end components of the user equipment 10.

That is, in most cases, MSD for the user equipment 10 (e.g., when in use by a consumer) may have better performance than that specified for a test configuration (e.g., as performed when the user equipment 10 is manufactured). As some user equipment 10 in the field have seen better MSD performance than what is defined in the 3GPP specifications, proposals have been introduced to the 3GPP to support frequency band combination for the user equipment 10 having improved (e.g., lower) MSD. For example, such proposals introduce a capability to enable the user equipment 10 to indicate support for the improved MSD.

However, as proposed, this capability may only be reported at a specified worst-case carrier configuration, but not necessarily, and indeed likely not, for the MSD for the configuration scheduled by the network 62, which could potentially negatively impact the network's scheduling efficiency. Without in-situ MSD measurement, the user equipment 10 may instead store all pre-measured MSD values for all supported band combinations with MSD impact, which may be an excessive load on the memory 14. Additionally, MSD measurement may include a time-consuming process, which could substantially increase factory test cost per user equipment. Further, depending on granularity for storing the MSD values (e.g., a number of bits used to represent each MSD value), the reported MSD threshold may have a large tolerance to the exact MSD.

The disclosed embodiments include configuration-based MSD reporting, which may be triggered by the network 62 (or a base station 64 of the network 62) based on a carrier configuration that is assigned to the user equipment 10 by the network 62. In particular, the network 62 may perform MSD occurrence pre-screening (e.g., determine whether the particular frequency band or carrier combination may result in interference) to decide whether to cause or instruct the user equipment 10 to perform the in-situ MSD measurement and report the MSD value. This may avoid the disadvantages of the lower MSD capability signaling scheme described above.

Configuration-based MSD reporting may be performed either semi-statically (e.g., when a new frequency band or carrier combination is assigned to the user equipment 10, when the RRC configuration changes, and so on) or dynamically (e.g., when the network 62 changes, when the base station 64 changes, and so on). Upon receiving the MSD value from the user equipment 10, the network 62 or the base station 64 may schedule the user equipment 10 for wireless transmission/reception using the carrier combination based on the MSD value. For example, the network 62 may compare the MSD value to an MSD threshold. If the MSD value does not exceed the threshold, then the network 62 may schedule or configure the user equipment 10 to use the carrier combination. If the MSD value exceeds the threshold, then the network 62 may perform a mitigation action, such as downgrading transmission or reception of data, such as by only scheduling one carrier of the carrier combination to the user equipment 10, only scheduling a master cell group in a dual-connectivity (DC) combination, only scheduling a primary cell (PCell) operation in a carrier aggregation (CA) combination, disabling secondary cell (SCell) uplink transmission in a 2-uplink (2UL) CA combination, disabling SCell downlink reception if it is impacted by either PCell uplink or both PCell and SCell uplink intermodulation product, or even not scheduling any operation for the UE 10. As another example, the network 62 or the base station 64 may implement MSD-aware scheduling, where the modulation and coding rate configurations for the impacted downlink carriers are determined based on the user equipment's reported degradation in sensitivity.

Figure 4:
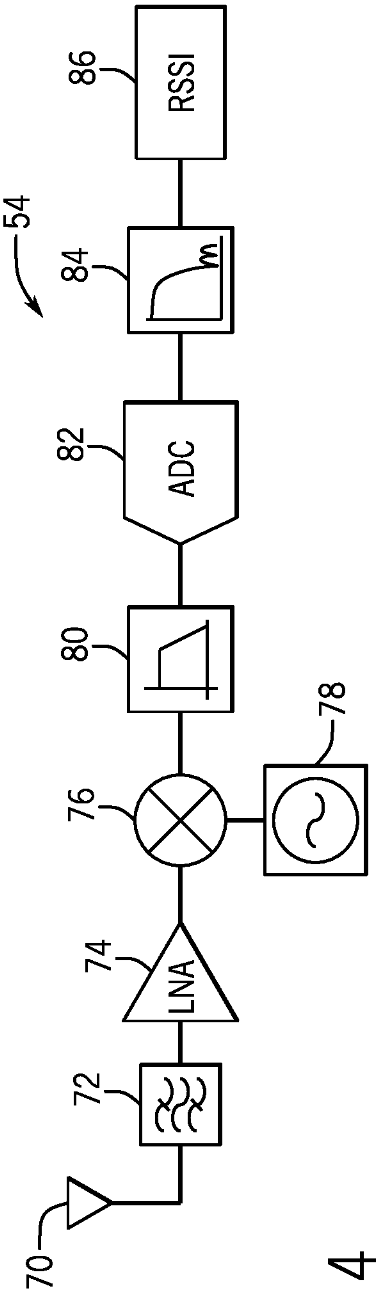
FIG. 4 is a schematic diagram of a receiver of the user equipment of FIG. 1, according to embodiments of the present disclosure.

FIG. 4 is a schematic diagram of the receiver 54 of the user equipment 10, according to embodiments of the present disclosure. As illustrated, the receiver 54 includes an antenna 70, a band-pass filter (BPF) 72, a low noise amplifier (LNA) 74, a mixer 76, an analog baseband and/or low pass filter (LPF) 80, an analog-to-digital converter (ADC) 82, a digital channel filter 84, and a power detector 86. In some embodiments, the antenna 70 of the receiver may be representative of the antennas 55 of the user equipment 10 of FIG. 2. In some embodiments, the antenna 70 may be a separate and additional antenna of the user equipment 10.

In operation, the receiver 54 may receive a received signal via the antenna 70 at the band-pass filter 72 (BPF), which may filter undesired frequencies or frequency bands from the received signal. The LNA 74 may then amplify the band-pass filtered signal. The amplified signal may be mixed, using the mixer 76, with a local oscillation signal provided by a local oscillator 78 (LO), and then be passed through the LPF 80. The ADC 82 may then convert the signal to a digital format, and the digital signal may then be input to the digital channel filter 84, which may be implemented as a finite impulse response (FIR) filter. The digital channel filter 84 may filter the digital signal to enable pass through of the signal within a desired channel bandwidth, resulting in an output signal. The power detector 86 may determine or measure a power (or Received Signal Strength Indicator (RSSI)) of the signal output by the digital channel filter 84.

Figure 5:
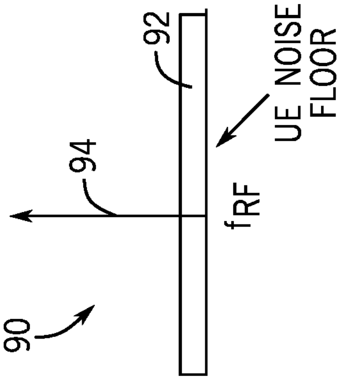
FIG. 5 is a plot of a noise floor of the user equipment of FIG. 1.

With the foregoing in mind, FIG. 5 is a plot of a noise floor 92 of the user equipment 10. The noise floor 92 of the user equipment 10 may refer to what the antenna 70 may receive when no downlink transmission is sent from the base station 64 to the user equipment 10. The horizontal axis of the plot of FIG. 5 represents frequency (e.g., in Hertz), and the vertical axis of the plot of FIG. 5 represents power (e.g., in dB). $f_{RF}$ 94 may represent a center frequency for a channel or carrier assigned to the user equipment 10 by the network 62.

Figure 6:
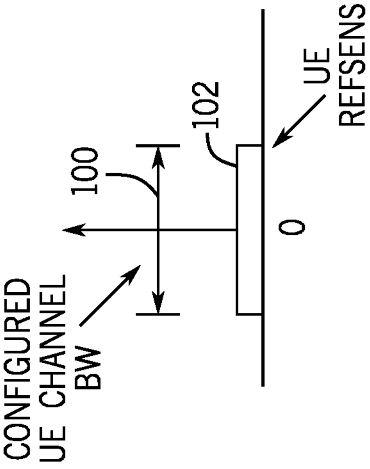
FIG. 6 is a plot of a reference sensitivity (REFSENS) of the user equipment of FIG. 1.

FIG. 6 is a plot of a reference sensitivity (REFSENS) of the user equipment 10. When received by the receiver 54, the noise floor 92 may be filtered by the digital channel filter 84, which may block the noise floor 92 outside a bandwidth 100 of the channel or carrier. The remaining noise floor 92 that passes through the digital channel filter 84 may be referred to as the REFSENS 102. The user equipment 10 may then cause the power detector 86 to determine or measure a power of the REFSENS 102, generating a REFSENS power value.

Figure 7:
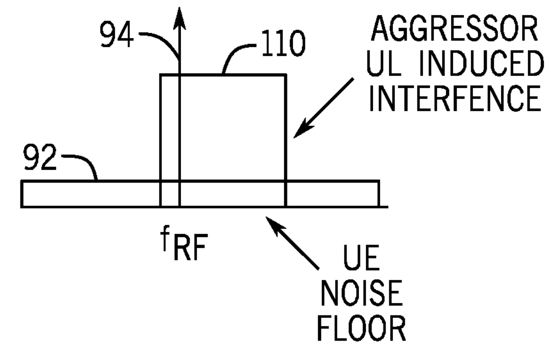
FIG. 7 is a plot of aggressor uplink-induced interference of the user equipment of FIG. 1.

FIG. 7 is a plot of aggressor uplink-induced interference of the user equipment 10. In particular, the user equipment 10 may receive an allocated carrier combination from the network 62. The user equipment 10 may then set an output power of the transmitter 52 to a predetermined value and transmit certain uplink signals. The predetermined value may include a maximum transmission power of the transmitter 52 as defined by a standards body (e.g., 3GPP) via any suitable specification (e.g., which may be referred to as PCMAX). As such, the predetermined value may be based on any number of factors, such as a serving cell of the network 62, signaling by the base station 64, a carrier frequency, a power class of the user equipment 10, a maximum power reduction (MPR) taking into account modulation versus the channel bandwidth 100 and transmission bandwidth, an allowed additional maximum power reduction (A-MPR) to account for ACLR (Adjacent Channel Leakage Ratio), spectrum emission and spurious emission requirements for carrier aggregation, an allowed maximum output power reduction (P-MPRc) to ensure compliance with applicable electromagnetic energy absorption requirements and addressing unwanted emissions/self desense requirements in case of simultaneous transmissions on multiple radio access technologies or to ensure compliance with applicable electromagnetic energy absorption requirements in case of proximity detection is used to address such requirements that require a lower maximum output power, a bandwidth of the channel, and so on. It should be noted that the user equipment 10 may receive an indication to transmit these uplink signals, either from the processor 12 of the user equipment 10 and/or from the network 62 via the base station 64. The uplink signals transmitted by the transmitter 52 may include test signals that, for example, mimic or represent signals to be transmitted (e.g., during operation, with data payload, and so on).

Figure 8:
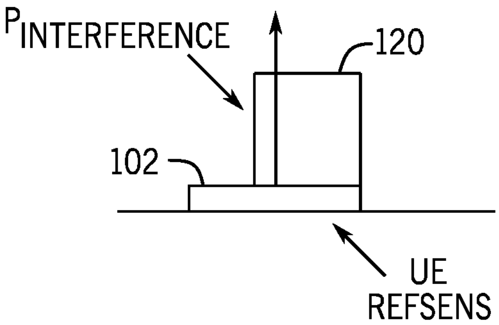
FIG. 8 is a plot of the aggressor uplink-induced interference of FIG. 8 filtered by a digital channel filter of the receiver of FIG. 4, along with the REFSENS of FIG. 6.

As illustrated, the aggressor uplink-induced interference 110 may be offset from and/or not be centered at the center frequency 94 of the carrier and/or channel. FIG. 8 is a plot of the aggressor uplink-induced interference 110 filtered by the digital channel filter 84 of the receiver 54, along with the REFSENS 102. That is, when received by the receiver 54, the interference 110 may be filtered by the digital channel filter 84, which may block the interference 110 outside the channel or carrier bandwidth 100. The remaining interference 110 that passes through the digital channel filter 84 may be referred to as channel or carrier interference 120. The user equipment 10 may then cause the power detector 86 to determine or measure a power of the carrier interference 120, generating a carrier interference power value, $P_{interference}$. As illustrated, when determining or measuring the power of the carrier interference 120, the power of the REFSENS 102 may also be captured. However, deviation due to the REFSENS 102 may be at most 3 dB, which may be negligible. Moreover, because $P_{interference}$ is typically greater (e.g., much greater, 10 dB to 15 dB greater) relative to the REFSENS value, $P_{interference}$ may dominate the determination or measurement of the carrier interference 120 by the power detector 86, which may be preferable.

With the REFSENS value and the $P_{interference}$ (e.g., stored in the memory 14), the processor 12 may determine or estimate the MSD value by determining a difference between the two power values. The user equipment 10 may then transmit and/or report the MSD value (e.g., via the transmitter 52) to the network 62 via the base station 64, which may then evaluate the MSD value (e.g., compare the MSD value to a threshold) and determine whether to schedule or configure the user equipment 10 for the carrier combination or perform a mitigation action.

Figure 9:
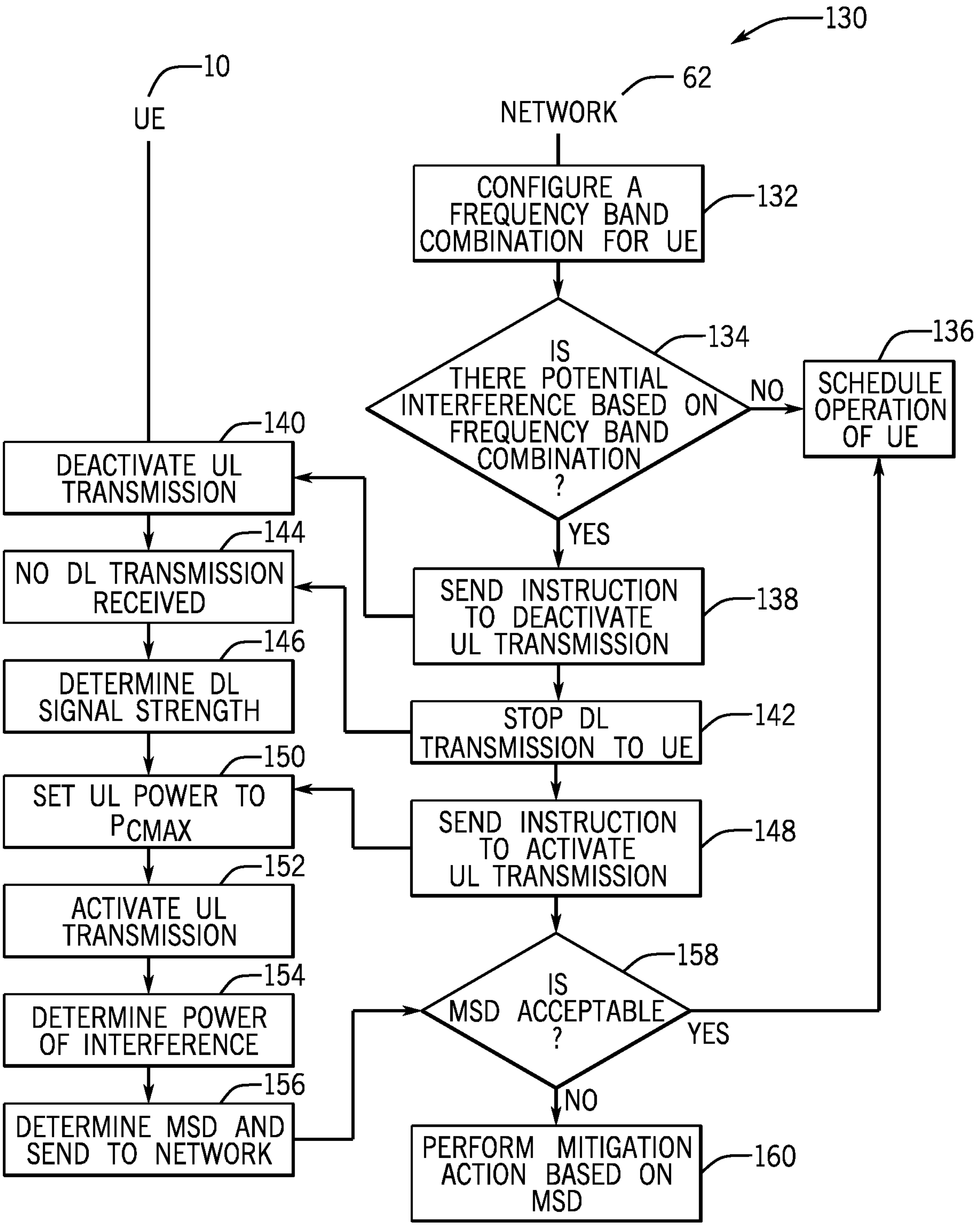
FIG. 9 is a flowchart for determining a maximum sensitivity degradation (MSD) value of the receiver of FIG. 4 and sending the value to the network of FIG. 3, according to embodiments of the present disclosure.

FIG. 9 is a flowchart of a process 130 for determining the MSD value of the receiver 54 and sending the value to the network 62, according to embodiments of the present disclosure. Any suitable device (e.g., a controller) that may control components of the user equipment 10, the base station 64, and/or the network 62, such as the processor 12 of any of the user equipment 10, the base station 64, and/or the network 62, may perform the process 130. In some embodiments, the process 130 may be implemented by executing instructions stored in a tangible, non-transitory, computer-readable medium, such as the memory 14 or storage 16 of the user equipment 10, the base station 64, and/or the network 62, using the processor 12. For example, the process 130 may be performed at least in part by one or more software components, such as an operating system of the user equipment 10, the base station 64, and/or the network 62, one or more software applications of the user equipment 10, the base station 64, and/or the network 62, and the like. While the process 130 is described using steps in a specific sequence, it should be understood that the present disclosure contemplates that the described steps may be performed in different sequences than the sequence illustrated, and certain described steps may be skipped or not performed altogether.

Initially, the user equipment (UE) 10 may request to establish communication using the network 62 (e.g., a cellular network, such as a 4G/LTE or 5G/NR network). The network 62 may be implemented as at least one communication hub or base station, such as the base stations 64 (e.g., an eNodeB or gNodeB) discussed with respect to FIG. 3. At process block 132, the network 112 may configure a frequency band combination for the UE 10. The frequency band combination may include any suitable combination of frequency bands for uplink and/or downlink, as well as any suitable frequency bands (e.g., Evolved Universal Mobile Telecommunications System (UMTS) Terrestrial Radio Access (EUTRA)/NR bands 20, n8, and so on). In particular, the frequency band combination may include a combination of multiple component carriers, which may be included in different frequency bands or the same frequency band.

At process block 134, the network 62 may determine if there is potential or a likelihood of interference (e.g., self-interference, such as intermodulation) that would occur between the frequency bands if the UE 10 were to operate (e.g., perform downlink or uplink operations) on the frequency bands. For example, for a 2-frequency band combination, the network 62 may determine whether there is potential interference based on the following equations and the table 200 shown in FIG. 10:

$$f_{INT} = a\times f_{TX1} + b\times f_{RX1} + c\times f_{TX2} + d\times f_{RX2} \quad \text{(Equation 1)}$$

$$BW_{INT} = |a|\times CBW_{TX1} + |c|\times CBW_{TX2} \quad \text{(Equation 2)}$$

$$|f_{INT}| < \frac{BW_{INT} + CBW_{RX1}}{2} \quad \text{(Equation 3)}$$

$$|f_{INT}| < \frac{BW_{INT} + CBW_{RX2}}{2} \quad \text{(Equation 4)}$$

where, assuming the interference is limited to up to 5th order mixing products:

"a" is an integer with a range between −5 and +5;

"b" is either −1, 0, or +1;

"c" is an integer with a range between −5 and +5;

"d" is either −1, 0, or +1;

$f_{INT}$ is the interference center frequency after receiver frequency down conversion;

$BW_{INT}$ is the effective bandwidth (BW) of the interference (INT);

$CBW_{TX1}$ is the uplink carrier channel BW for component carrier CC1;

$CBW_{TX2}$ is the uplink carrier channel BW for CC2;

$CBW_{RX1}$ is the downlink carrier channel BW for CC1; and.

$CBW_{RX2}$ is the downlink carrier channel BW for CC2.

The table 200 and the Equations (1)-(4) above may be used by the network 62 to determine an uplink carrier frequency and a downlink carrier frequency for a particular band configuration. Based on the uplink and/or downlink carrier frequencies, the network 62 may determine whether there is interference generated from the uplink side that would affect (e.g., fall onto) the downlink carrier. The network 62 may determine some of the coefficients 204, 206 for the uplink and downlink, respectively, for each band combination prior to configuring the UE 10 for the band combination. The network 62 may use Equations (3) and (4) to determine when the co-channel interference is overlapping the downlink carrier channel for CC1 and CC2, respectively. For example, if Equation (3) is true, the interference overlaps (e.g., falls within) the downlink carrier channel BW for component carrier 1. Similarly, if Equation (4) is true, the interference overlaps the downlink carrier channel BW for component carrier 2.

As shown in the table 200, the network may also determine an interference type 212, such as intermodulation (IMD) interference or harmonic interference. The coefficients 204, 206 may be related to the type of interference type 212. The network may also determine a harmonic order 208 of the interference. Advantageously, the information in the table 200 may be determined by the network before configuring the UE 10 for a particular frequency band combination.

If the inequality of Equation 3 is met, then there is potential interference impacting downlink carrier 1 (e.g., downlink of carrier 1). If the inequality of Equation 4 is met, then there is potential interference impacting downlink carrier 2 (e.g., downlink of carrier 2). It should be understood that use of the table 200 is only one example of determining whether there is potential interference in a carrier combination, and any suitable method, including those adopted by any suitable standard body (including 3GPP) is contemplated. This determination may be referred to as an MSD occurrence pre-screening process.

Turning back to FIG. 9, if there is no potential interference at process block 134, then the network 62 may schedule operation of the UE 10 on the combination of frequency bands or carriers at process block 136. The UE 10 may then transmit and receive signals using the carrier combination. If the network 62 determines there is potential interference impacting downlink carrier 1, downlink carrier 2, or both, then the network 62 may instruct the UE 10 to determine the MSD value. In particular, the network 62 sends an instruction to the UE 10 to deactivate uplink transmissions (e.g., signals) at process block 138, though, in additional or alternative embodiments, the network 62 may send an indication to the UE 10 to determine the MSD value (which may include the instruction to the UE 10 to deactivate uplink transmissions).

At process block 140, the UE 10 deactivates uplink transmissions. In some embodiments, the UE 10 may deactivate uplink transmissions that are cross-band with or may affect operation on the frequency band combination, while, in other embodiments, the UE 10 may deactivate all uplink transmissions. At process block 142, the network 62 then stops downlink transmissions (e.g., signals) to the UE 10. As such, the UE 10 receives no downlink transmissions from the networ 62, as shown in process block 144 (e.g., the channel is empty of transmissions). At process block 146, the UE 10 may then determine or measure downlink signal strength or RSSI (e.g., on the allocated carrier combination, on downlink carrier 1, downlink carrier 2, or both) using the power detector 86, thus determining or measuring the REFSENS 102 as shown in FIG. 6. Because at least cross-band uplink transmissions are deactivated on the UE 10, at process block 144, the UE 10 may determine or measure the REFSENS 102 without the interference 110 (e.g., at least self-interference caused by uplink transmissions or aggressors or downlink receptions or aggressors). It should be understood that, in some embodiments, the REFSENS value may be pre-measured or pre-determined and stored (e.g., in the memory 14), thus obviating performance of process block 138-146, though performance of process blocks 138-146 may yield a more accurate MSD value as the REFSENS value is measured or determined during operation and with real-world, actual use parameters.

At process block 148, the network 62 then sends an instruction to the UE 10 to activate uplink transmissions (e.g., the uplink aggressors) that may cause the self-interference 110 (e.g., self-generated). While the disclosure may refer to activating uplink transmissions, it should be understood that, at least in some cases, the instruction to the UE 10 may additionally or alternatively include activating downlink receptions (e.g., downlink aggressors) that may cause the self-interference 110.

At process block 150, the UE 10 sets uplink or transmission power of the transmitter 52 to a predetermined value. The predetermined value may include a maximum transmission power of the transmitter 52 as defined by a standards body (e.g., 3GPP) via any suitable specification (e.g., which may be referred to as $P_{CMAX}$). In some embodiments, the UE 10 may receive an indication from the network 62 to set the transmission power to the predetermined value, while in additional or alternative embodiments, the indication may be generated and received from the UE 10 (e.g., the processor 12 of the UE 10). In particular, the UE 10 may set the transmission power of the transmitter 52 to the predetermined value via an open-loop power control procedure, a closed-loop power control procedure, or an MSD test function. The open-loop power control procedure may include the network 62 indicating to the UE 10 to perform uplink transmissions with a specified power that the UE 10 cannot reach in order to force the UE 10 transmit at a maximum power (e.g., corresponding to the predetermined value). The closed-loop power control procedure may include the network 62 indicating (e.g., via transmit power control commands) that the UE 10 should increase its transmission power by a specified increment, such as 1 dB, 2 dB, 5 dB, 10 dB and so on. The MSD test function may include the UE 10 automatically setting the transmission power of the transmitter 52 to the predetermined value as instructed by the network 62 (e.g., without indication of the predetermined value by the network 62). In some embodiments, the predetermined value may be lower than the maximum transmission power of the transmitter 52. For example, it may be useful for the network 62 to receive MSD values corresponding to transmission power of the transmitter 52 at lower than maximum transmission powers (e.g., with a power back-off applied). Accordingly, the network 62 may instruct the UE 10 to determine the MSD value with lower than maximum transmission powers (e.g., with one or more power back-offs applied), in addition to or instead of the MSD value determined with the maximum transmission power.

At process block 152, the UE 10 activates uplink transmissions. For example, the UE 10 may send one or more test signals to the base station 64 (e.g., on uplink of carrier 1, uplink of carrier 2, or both). The test signal may mimic or copy a “real” signal or a signal that would typically be sent to the network 62 from the UE 10 using the carrier combination.

At process block 154, the UE 10 then determines (e.g., using the power detector 86) a power or RSSI of the interference 120 (e.g., on the carrier combination, on downlink carrier 1, downlink carrier 2, or both), to generate $P_{interference}$. At process block 156, the UE 10 determines the MSD value based on the REFSENS value from process block 146 and $P_{interference}$ from process block 154. In particular, the UE 10 may determine a difference between the REFSENS value and $P_{interference}$ to determine the MSD value. It should be understood that, in some embodiments, the UE 10 may determine the MSD value by setting the MSD value to $P_{interference}$, without applying the REFSENS value. That is, performance of process block 138-146 may be skipped altogether. Such a procedure may be useful where $P_{interference}$ is sufficient for the network 62 to perform carrier combination scheduling, though performance of process blocks 138-146 may yield a more accurate MSD value as it factors in the REFSENS value.

The network 62 receives the MSD value via the base station 64, and then, in process block 158, the network 62 determines whether the MSD value is acceptable. For example, the network 62 may compare the MSD value to an MSD threshold. If the MSD value does not exceed the threshold, then, in process block 136, the network 62 may schedule or configure the user equipment 10 to use the carrier combination.

If the MSD value exceeds the threshold, then, in process block 160, the network 62 may perform a mitigation action based on the MSD value. For example, the network 62 may downgrade transmission or reception of data, such as by only scheduling one carrier of the carrier combination to the user equipment 10, only scheduling a master cell group in a dual-connectivity (DC) combination, only scheduling a primary cell (PCell) operation in a carrier aggregation (CA) combination, disabling secondary cell (SCell) uplink transmission in a 2-uplink (2UL) CA combination, disabling SCell downlink reception if it is impacted by either PCell uplink or both PCell and SCell uplink intermodulation product, or even not scheduling any operation for the UE 10. As another example, the network 62 may implement MSD-aware scheduling, where the modulation and coding rate configurations for the impacted downlink carriers are determined based on the user equipment's reported degradation in sensitivity. In this manner, the process 130 may determine the MSD value of the receiver 54 of the user equipment 10 and send the value to the network 62, which may schedule the user equipment 10 accordingly.

In some embodiments, the UE 10 may include more than one receive path (e.g., each receive path including the receiver 54). For example, the UE 10 may include a main receive path, and one or more diversity receive paths. Each path may experience different REFSENS 102 and/or self-interference 120 (e.g., because of different isolation performance). In such embodiments, the UE 10 may determine or measure the REFSENS value and/or the $P_{interference}$ for each receive path, the main receive path, or one or more diversity receive paths, and determine the MSD value of these paths. The UE 10 may then report each MSD value for any or all of these paths, or a mathematical combination of the MSD values for multiple paths (e.g., a maximum MSD value, a minimum MSD value, a mean MSD value, a weighted mean MSD value, a median MSD value, a mode MSD value, and so on). Additionally or alternatively, the network 62 may determine the mathematical combination of the MSD values for the multiple paths. In any case, the network 62 may then use this mathematical combination of the MSD values or each MSD value of the multiple paths to determine whether the collective MSD values are acceptable in process block 158 of FIG. 9.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:

ceasing uplink transmissions on a transmitter of user equipment;

receiving a first indication of reference sensitivity at a receiver of the user equipment when a base station is not sending a downlink transmission to the receiver and while the uplink transmissions are ceased;

setting the transmitter to transmit at a predetermined power level;

causing the transmitter to transmit subsequent uplink transmissions at the predetermined power level;

receiving a second indication of interference power at the receiver based on the subsequent uplink transmissions; and causing the transmitter to transmit a maximum sensitivity degradation (MSD) value based on the reference sensitivity and the interference power.

2. The method of claim 1, wherein the interference is caused by the uplink transmissions.

3. The method of claim 1, comprising determining, by processing circuitry of the user equipment, the MSD value.

4. The method of claim 1, wherein the MSD value comprises a difference between the reference sensitivity and the interference power.

5. The method of claim 4, wherein the base station allocates a first frequency band and a second frequency band to the user equipment, the interference being received on the first frequency band, the uplink transmissions being transmitted on the second frequency band, and the interference received on the first frequency band being caused by the uplink transmissions on the second frequency band.

6. The method of claim 1, wherein the first indication comprises a Reference Signal Strength Indicator.

7. The method of claim 1, wherein the second indication comprises a Reference Signal Strength Indicator.

8. The method of claim 1, comprising receiving a subsequent downlink transmission from the base station comprising a third indication from the base station to set the transmitter to transmit at the predetermined power level.

9. Tangible, non-transitory, computer-readable media, storing instructions that cause processing circuitry to:

cease uplink transmissions on a transmitter of user equipment;

receive a first indication of reference sensitivity of a receiver of the user equipment when a base station is not sending a downlink transmission to the receiver and while the uplink transmissions are ceased;

cause the transmitter of the user equipment to transmit subsequent uplink transmissions comprising a signal at a predetermined power level;

receive a second indication of interference power at the receiver based on the subsequent uplink transmissions; and cause the transmitter to transmit a maximum sensitivity degradation (MSD) value to the base station based on the reference sensitivity and the interference.

10. The tangible, non-transitory, computer-readable media of claim 9, wherein the predetermined power level comprises a maximum transmission power of the transmitter.

11. The tangible, non-transitory, computer-readable media of claim 9, wherein the instructions cause the processing circuitry to determine the MSD value by determining a difference between the reference sensitivity of the receiver and the interference power.

12. The tangible, non-transitory, computer-readable media of claim 9, wherein the instructions cause the processing circuitry to determine the reference sensitivity by causing a power detector of the receiver to determine a signal strength at the receiver when the base station is not sending the downlink transmission to the receiver.

13. The tangible, non-transitory, computer-readable media of claim 9, wherein the instructions cause the processing circuitry to determine the interference power at the receiver by causing a power detector of the receiver to determine a signal strength at the receiver when the transmitter transmits the signal at the predetermined power level.

14. The tangible, non-transitory, computer-readable media of claim 13, wherein the instructions cause the processing circuitry to determine the interference power at the receiver by determining the signal strength at the receiver on a first component carrier when the transmitter transmits the signal on a second component carrier.

15. Wireless communication circuitry comprising:

processing circuitry configured to cease uplink transmissions on a transmitter of the wireless communication circuitry, and receive a first indication of reference sensitivity when a base station is not sending a downlink transmission to a receiver of the wireless communication circuitry and while the uplink transmissions are ceased;

the receiver configured to receive a second indication of interference power at the receiver based on subsequent uplink transmissions; and the transmitter configured to transmit the subsequent uplink transmissions comprising a signal at a predetermined power level, and transmit a maximum sensitivity degradation (MSD) value to the base station based on the reference sensitivity and the interference.

16. The wireless communication circuitry of claim 15, wherein the predetermined power level comprises a maximum transmission power of the transmitter.

17. The wireless communication circuitry of claim 15, wherein the processing circuitry is configured to determine the MSD value by determining a difference between the reference sensitivity of the receiver and the interference power.

18. The wireless communication circuitry of claim 15, wherein the processing circuitry is configured to determine the reference sensitivity by causing a power detector of the receiver to determine a signal strength at the receiver when the base station is not sending the downlink transmission to the receiver.

19. The wireless communication circuitry of claim 15, wherein the processing circuitry is configured to determine the interference power at the receiver by causing a power detector of the receiver to determine a signal strength at the receiver when the transmitter transmits the signal at the predetermined power level.

20. The wireless communication circuitry of claim 19, wherein the processing circuitry is configured to determine the interference power at the receiver by determining the signal strength at the receiver on a first component carrier when the transmitter transmits the signal on a second component carrier.

* * * * *